(12) United States Patent
Monroe et al.

(10) Patent No.: US 11,152,756 B2
(45) Date of Patent: Oct. 19, 2021

(54) LASER CAVITY REPETITION RATE TUNING AND HIGH-BANDWIDTH STABILIZATION

(71) Applicants: University of Maryland, College Park, College Park, MD (US); IonQ, Inc., College Park, MD (US)

(72) Inventors: Christopher Monroe, Columbia, MD (US); Kai Hudek, Hyattsville, MD (US); Jonathan Mizrahi, Silver Spring, MD (US); Marko Cetina, Berwyn Heights, MD (US); Sarah Margaret Kreikemeier, Washington, DC (US); Michael Goldman, College Park, MD (US); Kristin Beck, College Park, MD (US)

(73) Assignees: UNIVERSITY OF MARYLAND, COLLEGE PARK, College Park, MD (US); IONQ, INC., College Park, MD (US)

( * ) Notice: Subject to any disclaimer, the term of this patent is extended or adjusted under 35 U.S.C. 154(b) by 217 days.

(21) Appl. No.: 16/518,714

(22) Filed: Jul. 22, 2019

(65) Prior Publication Data

US 2020/0028312 A1    Jan. 23, 2020

Related U.S. Application Data

(60) Provisional application No. 62/702,096, filed on Jul. 23, 2018.

(51) Int. Cl.
*H01S 3/08* (2006.01)
*H01S 3/086* (2006.01)
(Continued)

(52) U.S. Cl.
CPC ............ *H01S 3/086* (2013.01); *G02B 7/1827* (2013.01); *G06N 10/00* (2019.01); *H01S 3/025* (2013.01);
(Continued)

(58) Field of Classification Search
CPC ...... H01S 3/086; H01S 3/025; H01S 3/06725; G06N 10/00; G02B 7/1827
See application file for complete search history.

(56) References Cited

U.S. PATENT DOCUMENTS

| 5,080,482 A | 1/1992 | Benz et al. |
| 5,481,202 A | 1/1996 | Frye, Jr. |

(Continued)

OTHER PUBLICATIONS

International Search Report and Written Opinion corresponding to International Application No. PCT/US2019/042982, dated Dec. 2, 2019.

*Primary Examiner* — Yuanda Zhang
(74) *Attorney, Agent, or Firm* — Arent Fox LLP

(57) ABSTRACT

The disclosure describes aspects of laser cavity repetition rate tuning and high-bandwidth stabilization of pulsed lasers. In one aspect, an output optical coupler is described that includes a cavity output coupler mirror, a piezoelectric actuator coupled to the cavity output coupler mirror, a locking assembly within which the cavity output coupler mirror and the piezoelectric actuator are positioned, and one or more components coupled to the locking assembly. The components are configured to provide multiple positional degrees of freedom for tuning a frequency comb spectrum of the pulsed laser (e.g., tuning a repetition rate) by adjusting at least one position of the locking assembly with the cavity output coupler mirror. A method of adjusting an output optical coupler in a pulsed laser is also described. These techniques may be used in different applications, including quantum information processing.

32 Claims, 6 Drawing Sheets

(51) Int. Cl.
*H01S 3/02* (2006.01)
*H01S 3/067* (2006.01)
*G06N 10/00* (2019.01)
*G02B 7/182* (2021.01)
*H01S 3/094* (2006.01)

(52) U.S. Cl.
CPC .... *H01S 3/06725* (2013.01); *H01S 3/094053* (2013.01)

(56) References Cited

U.S. PATENT DOCUMENTS

| | | |
|---|---|---|
| 2004/0233944 A1 | 11/2004 | Dantus et al. |
| 2006/0182154 A1* | 8/2006 | Tanaka .................. H01S 3/139 372/9 |
| 2006/0215724 A1* | 9/2006 | Sesko .................... H01S 5/141 372/107 |
| 2007/0002907 A1* | 1/2007 | Ell ........................ H01S 3/1112 372/18 |
| 2007/0070345 A1 | 3/2007 | Araragi et al. |
| 2007/0133931 A1 | 6/2007 | Lee et al. |
| 2009/0231593 A1 | 9/2009 | Freimann |
| 2011/0058248 A1 | 3/2011 | Vodopyanov et al. |
| 2011/0310497 A1 | 12/2011 | Ashcraft et al. |
| 2013/0293946 A1 | 11/2013 | Fermann et al. |
| 2019/0042392 A1* | 2/2019 | Matsuura .............. G06N 10/00 |
| 2019/0363519 A1* | 11/2019 | Man ...................... H01S 5/4012 |

\* cited by examiner

SECTION A - A

LASER CAVITY REPETITION RATE TUNING AND HIGH-BANDWIDTH STABILIZATION

CROSS REFERENCE TO RELATED APPLICATION

The present application claims priority to and the benefit from US Provisional Patent Application No. 62/702,096, entitled "LASER CAVITY REPETITION RATE TUNING AND HIGH-BANDWIDTH STABILIZATION," and filed on Jul. 23, 2018, the contents of which are incorporated herein by reference in their entirety.

GOVERNMENT LICENSE RIGHTS

This invention was made with government support under Award No. W911NF1610082 by IARPA. The government has certain rights in the invention.

BACKGROUND OF THE DISCLOSURE

Aspects of the present disclosure generally relate to an output coupler assembly for a high-power laser, and more specifically, to an output coupler assembly that enables laser cavity repetition rate tuning and high-bandwidth stabilization.

Quantum bits or qubits made by using trapped atomic ions is one of the quantum information processing (QIP) approaches that has delivered universal and fully programmable machines. Individually and globally addressable qubit transitions can be driven by the frequency comb generated by a train of pulses emitted by a mode-locked laser. The position of the comb lines in frequency space is important for effectively driving these transitions while cancelling out any unwanted transitions as well as minimizing systematics. The phase noise of the frequency comb can directly impact the qubit fidelity and needs to be suppressed. Accordingly, it is desirable to control, tune, and/or stabilize the characteristics of the teeth in the frequency comb.

Industrial lasers that typically service the semiconductor industry are the most advanced, reliable, and stable ultraviolet pulsed lasers available, benefiting greatly from the high-level of investment in that industry. The semiconductor industry, however, does not typically need lasers with the types of characteristics described above, especially to the high-precision levels needed for quantum computing or other applications that require similar levels of control, tuning, and/or stabilization.

Accordingly, devices or systems are desirable that can improve the characteristics of lasers for use in quantum information processing and other applications that are sensitive to the features of the frequency comb generated by the lasers.

SUMMARY OF THE DISCLOSURE

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

By leveraging the architectures of commercially available lasers, the present disclosure proposes the use of an output coupler assembly that enables tunability of the frequency comb that spans the range physically relevant to an atomic quantum bit (qubit) in order to minimize (or maximize) off resonant coupling and systematics, scanning of the frequency comb for relevant measurements (e.g., spectroscopy), stabilizing of the frequency comb, and suppressing phase noise on the frequency comb.

The output coupler assembly is configured to include a mounting structure with the necessary degrees-of-freedom (DOFs) in which various components of the mounting structure are piezo (or otherwise motor) driven for external control in order to allow for in situ operation and optimization of the frequency comb. A high-bandwidth locking assembly that is part of the output coupler assembly may be used for tight locking of the frequency comb and suppression of the phase noise. The housing of the high-bandwidth locking assembly encloses and pressurizes a mirror-piezo actuator combination between mechanical gaskets made of a compliant material, such as rubber O-rings, for example. The mechanical gaskets (e.g., rubber O-rings) mechanically decouple the mirror and the piezo actuator from the surrounding environmental vibrations that would otherwise translate through the mirror mount. By applying a specified amount of pressure to the mechanical gaskets, certain resonances can be completely damped, while reducing the gain at other resonances and increasing their frequencies.

In an aspect of the present disclosure, an output optical coupler for a pulsed laser (e.g., mode-locked laser) is described that includes a cavity output coupler mirror, a piezoelectric actuator coupled to the cavity output coupler mirror, a locking assembly within which the cavity output coupler mirror and the piezoelectric actuator are positioned, and one or more components coupled to the locking assembly. The pulsed laser can be used for different applications, including multiple applications associated with quantum information processing or quantum computing. The one or more components are configured to provide multiple positional degrees of freedom for tuning a frequency comb spectrum of the pulsed laser by adjusting at least one position of the locking assembly with the cavity output coupler mirror.

In an aspect of the present disclosure, a method of adjusting an output optical coupler in a pulsed laser is described that includes detecting a change in a frequency comb spectrum of the pulsed laser with respect to a trapped ion qubit, generating a control signal based on the detected change, and providing the control signal to the output optical coupler, where the output optical coupler has a locking assembly with a cavity output coupler mirror and a piezoelectric actuator inside, and one or more components coupled to the locking assembly. The pulsed laser can be used for different applications, including multiple applications associated with quantum information processing or quantum computing. The method further includes adjusting, based on the control signal, one or more positional degrees of freedom of the locking assembly using the one or more components, the adjusting enables tuning of the frequency comb spectrum of the pulsed laser.

Each of the techniques described herein may be implemented in a quantum information processing (QIP) system or apparatus, and as part of a computer-readable medium.

BRIEF DESCRIPTION OF THE DRAWINGS

The appended drawings illustrate only some implementation and are therefore not to be considered limiting of scope.

DETAILED DESCRIPTION

Figure 1:
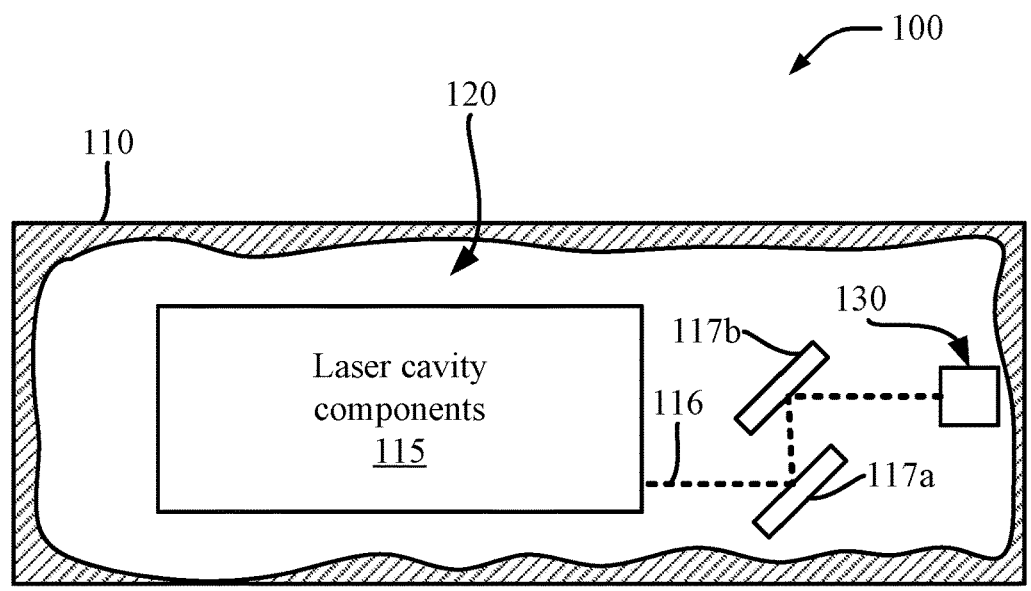
FIG. 1 is a diagram that illustrates an example of an output optical coupler in a laser cavity in accordance with aspects of this disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Industrial lasers or other high-end lasers can be used as reliable and stable ultra-violet (UV) pulsed lasers (e.g., mode-locked lasers). In one example, the lasers may produce the light in the infrared (IR) spectrum and using frequency doubling (to visible spectrum) and then performing a sum-frequency generation (essentially a frequency tripling) the UV is produced. The techniques described herein may apply to all types of lasers, including those that produce light in the IR, visible, and/or UV spectrum. These lasers, however, are not generally configured to provide the kind of laser characteristics and high-precision levels needed for quantum computing applications performed in, for example, trapped-ion quantum computers or quantum information processing (QIP) systems. For example, as pressure changes, or as temperature changes, the effective cavity length of the laser changes as well. The fidelity of the quantum gates being implemented in a quantum algorithm or simulation depends on the ability to have a tuned, stable laser output, which conventional industrial lasers may not be able to provide because of these environmental changes. Accordingly, for quantum computing applications, it is necessary to rapidly track these changes and provide some form of feedback to stabilize the laser's output.

Another issue that may arise in industrial lasers is the coupling of mechanical vibrations and/or resonances, which may limit the operating bandwidth needed for a pulsed laser to be effectively used for quantum computing applications.

One approach to address the issues mentioned above is the use of a mechanical assembly having a transducer or other similar device with which to control relevant spacing within the cavity of the laser in order to have better control of the repetition rate or rep rate of the laser, and thereby better control of the frequency comb (teeth) in the frequency domain of a pulsed laser. In a mode-locked laser, the repetition rate may refer to the number of pulses produced by the laser in a specific time unit. Mode-locking is used to produce pulses of light of extremely short duration, on the order of picoseconds or femtoseconds, by inducing a fixed-phase relationship between the longitudinal modes of the laser's resonant cavity, while constructive interference between these modes causes a train of pulses to be generated. When this happens, the laser is said to be "mode-locked" (or "phase-locked"). A type of laser that can be used as a mode-locked laser can be a solid-state laser such as a crystal-based Nd:YAG (neodymium-doped yttrium aluminum garnet) laser, simply referred to as a YAG laser or a Ti: Sapp (titanium-doped sapphire) laser, or a fiber-based laser using erbium-doped fiber as the gain medium.

Moreover, the mechanical assembly may be configured to provide a high-bandwidth operation by mechanically decoupling surrounding environmental vibrations and/or damping certain resonances while reducing the gain and increasing the frequency of other resonances.

Additional details regarding the various techniques described herein for laser cavity repetition rate tuning and high-bandwidth stabilization are provided below in connection with FIGS. 1-7.

FIG. 1 is a diagram 100 that illustrates an example of an output optical coupler 130 positioned within a laser cavity 120 in accordance with aspects of this disclosure. In the diagram 100, a partial view inside a laser 110 is shown to illustrate the laser cavity 120 and positioning of the output optical coupler 130 within the laser cavity 120. The diagram 100 shows a portion of a top of the laser 110 removed to illustrate the internal cavity of the laser 110. The laser 110 can be a pulsed laser (e.g., a mode-locked or phase-locked laser) such as a YAG laser, a Ti: Sapp laser, or a fiber-based laser, for example. The laser 110 can be used to produce one or more optical beams for different applications, including but not limited to quantum computing operations or quantum information processing, and consequently, the output of the laser 110 may be used to drive individual and global addressable qubit transitions with the frequency comb generated by a train of pulses emitted by the laser 110. As described above, the position of the comb lines in frequency space is important for effectively driving these transitions while cancelling out any unwanted transitions as well as minimizing systematics. The phase noise of the frequency comb can directly impact the qubit fidelity and needs to be suppressed.

The position of the output optical coupler 130 in the diagram 100 is provided by way of illustration and not of limitation. Accordingly, the output optical coupler 130 may be placed within the laser 110 in a position that is suitable to couple an optical beam produced by the optical coupler 130 to an output of the laser 110. Moreover, the laser cavity 120 is intended to illustrate the inner portions of the laser 110 and may include significantly more components other than the output optical coupler 130. For example, by way of illustration, the laser cavity 120 may include laser cavity components 115 that have one or more optical elements and/or one or more optoelectronic elements to generate at least one optical beam 116, which may be at least partially coupled to the optical coupler 130 using other optical elements 117a and 117b (e.g., mirrors or reflecting surfaces). The optical coupler 130 may use the optical beam 116 to produce the optical beam that is coupled to an output of the laser 110. For purposes of this disclosure, a cavity length (or a length of a cavity) need not represent a physical dimension of the laser 110 or the laser cavity 120, but may instead refer to an optical path within the laser cavity 120. A cavity length may also be referred to as an optical cavity, a resonating cavity, or an optical resonator, and includes an arrangement of mirrors and/or other optical elements that forms a standing wave cavity resonator for light waves. The cavity length may therefore be defined, at least in part, by the position of the output optical coupler 130 (or component therein), and any adjustments that may be needed to the cavity length can therefore be accomplished by making adjustments to the output optical coupler 130 (or components therein) as described in this disclosure.

Figure 2:
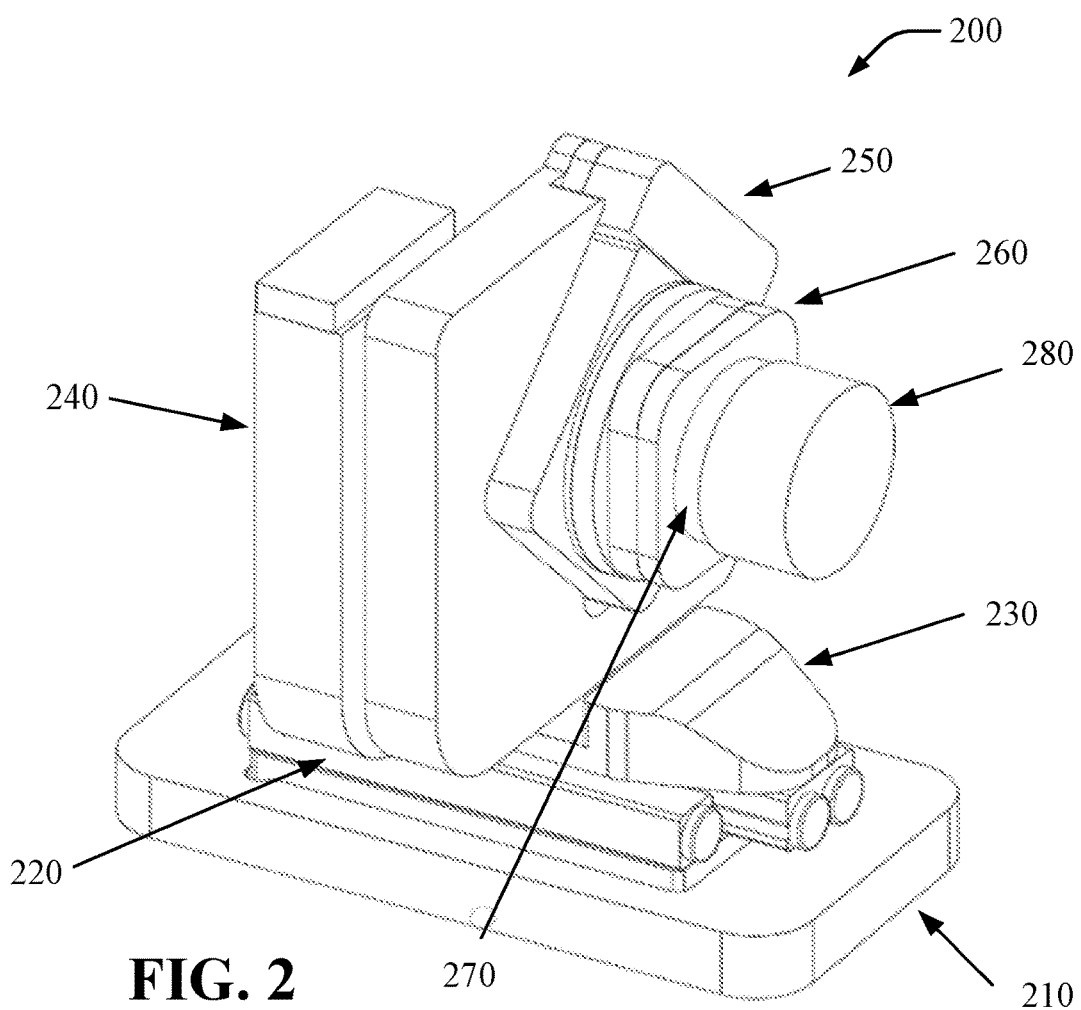
FIG. 2 is a diagram that illustrates an isometric view of an output optical coupler in accordance with aspects of this disclosure.

FIG. 2 shows a diagram 200 that illustrates an isometric view of an output optical coupler, such as the output optical coupler 130 in FIG. 1. In one implementation, the mounting structure of the output optical coupler 130 may include one or more of a base plate 210, a linear stage 220, a stage connector plate 230, a tip-tilt mirror mount 240, a rotation stage 250, a piezo connector stage 260, a piezoelectric transducer (piezo) 270, and a cavity output coupler mirror 280.

The base plate 210 is a laser-appropriate plate to mechanically and rigidly couple or connect the output optical coupler 130 to the laser (e.g., the laser 110). That is, the base plate 210 is physically attached to a flat portion inside the laser cavity 120. The linear stage 220 provides a long, precise travel along one or more directions (e.g., lateral plane, horizontal plane, or vertical plane) allowing for full control of the frequency comb spectrum with respect to a target application. For example, the linear stage 220 can be configured to provide horizontal translation in one or two directions for a target application. Moreover, in some implementations, the linear stage 220 can be configured to provide horizontal translation in one or two directions, vertical translation, or a combination thereof for a target application. In some instances, when the target application is quantum information processing, the frequency comb spectrum may be controlled with respect to a trapped-ion qubit (or multiple trapped-ion qubits). The stage connector plate 230 mounts the tip-tilt mirror mount 240 and the rotation stage 250 to the linear stage 220. In some implementations, the tip-tilt mirror mount 240 can enable movement in multiple degrees of freedom (DOFs) as well. This arrangement or configuration enables all the positional DOFs necessary for in situ optimization, which includes scanning of the frequency and optimization of power droop and drift. For example, the cavity output coupler mirror 280 can be linearly translated, rotated, and/or tilted to obtain an optimal position. In some implementations, the number of DOFs and/or the rotation supported may be less than in the example in the diagram 200 of FIG. 2 in order to provide a more robust and/or stable operation. In such cases, the mounting structure may include fewer components than those described in FIG. 2 but sufficient to enable the appropriate DOFs and/or rotation that is needed. In one example, if the output optical coupler 130 is rotation insensitive, then the rotation stage 250 may be omitted. In another example, if the output optical coupler 130 is tip-tilt insensitive, then the tip-tilt mirror mount 240 may be omitted.

The piezo connector stage 260 is mounted to the structure described above and allows for the ex situ mounting of the piezo 270 and the cavity output coupler mirror 280, which may be mounted as part of a high-bandwidth locking assembly described in more detail below (see e.g., FIG. 4B).

Each of the linear stage 220, the tip-tilt mirror mount 240, and the rotation stage 250 can be implemented using a piezoelectric actuator or a motor-driven actuator. Accordingly, each of the linear stage 220, the tip-tilt mirror mount 240, and the rotation stage 250 may be provided with one or more control signals to control a respective positional degree of freedom, where the individual control signals may collectively provide the appropriate positioning of the cavity output coupler mirror 280 to enable laser cavity repetition rate tuning.

Figure 3:
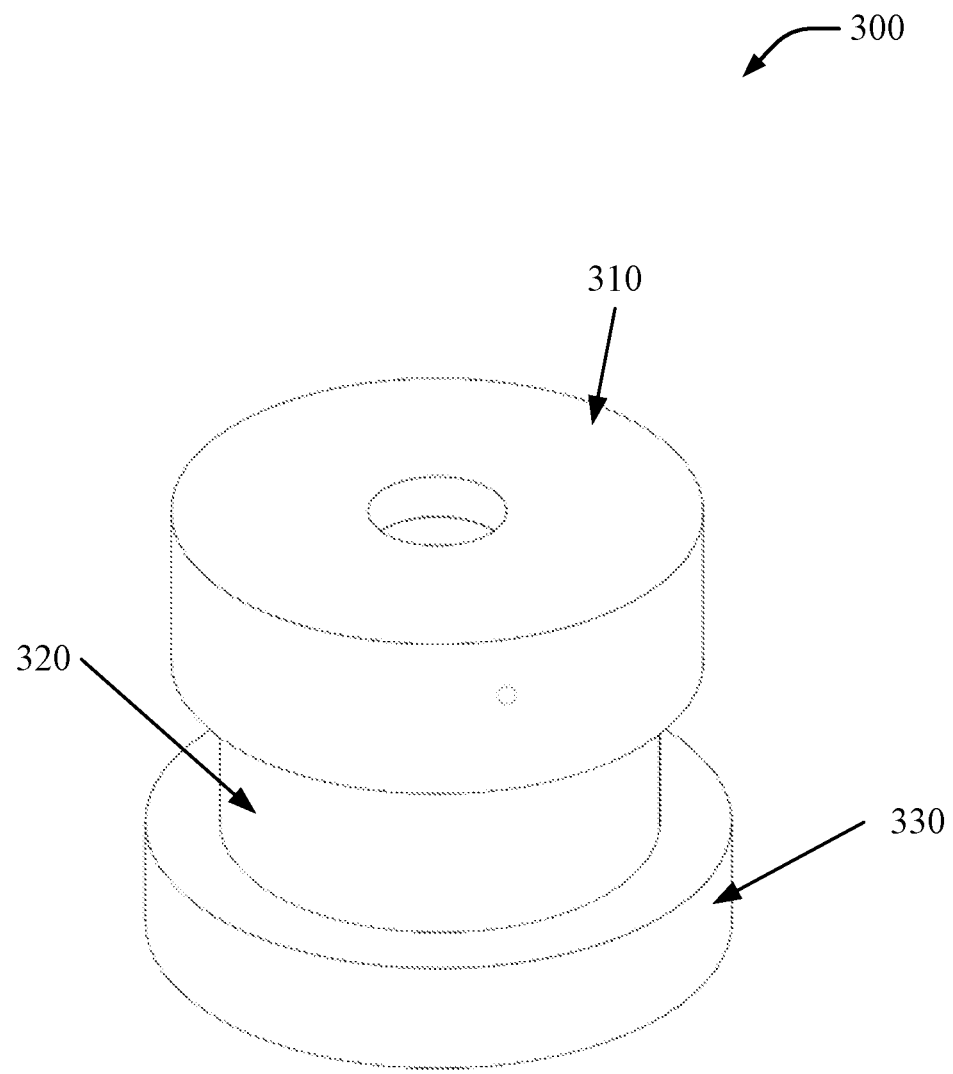
FIG. 3 is a diagram that illustrates an isometric view of a high-bandwidth locking assembly of an output optical coupler in accordance with aspects of this disclosure.

FIG. 3 shows a diagram 300 that illustrates an isometric view of a high-bandwidth locking assembly used with an output optical coupler, such as the output optical coupler 130 in FIG. 1. The locking assembly described in the example of the diagram 300 includes a pressurizing cap 310, a shaft 320, and a mounting plate 330. The cap 310 and the shaft 320 can form a housing having a top portion (e.g., the cap 310) and a bottom portion (e.g., the shaft 320).

In some implementations, the mounting plate 330 may be integrated with the shaft 320 to form a single component of the housing of the locking assembly.

The cap 310 can be a threaded cap and the shaft 320 can be a threaded shaft, and they can be held together by tightening the threaded cap onto the threaded shaft.

The cap 310 and the shaft 320 can additionally or alternatively be held together by a set of screws, a set of screws and bolts, wedged structures, or any other type of techniques suitable for mechanically holding two or more structural components together.

In an example, the cap 310 and the shaft 320 can be made, at least in part, of brass or other similar material, while the mounting plate 330 can be made, at least in part, of aluminum or other similar material. These materials may be selected so that they can operate at high-vacuum or ultra-high-vacuum conditions or systems, or other demanding operational environments. Accordingly, the materials from which the cap 310, the shaft 320, and the mounting plate 330 are made of may be materials with low outgassing. Some metals and plastics are suitable for use in high vacuum and ultra-high vacuum systems.

The cap 310 and the shaft 320 together form or provide a housing having an enclosed space within which the piezo 270 and/or the cavity output coupler mirror 280 described above in connection with the diagram 200 in FIG. 2 can be positioned. This enables a controlled pressure and corresponding frequency response of the locking assembly.

Figure 4A:
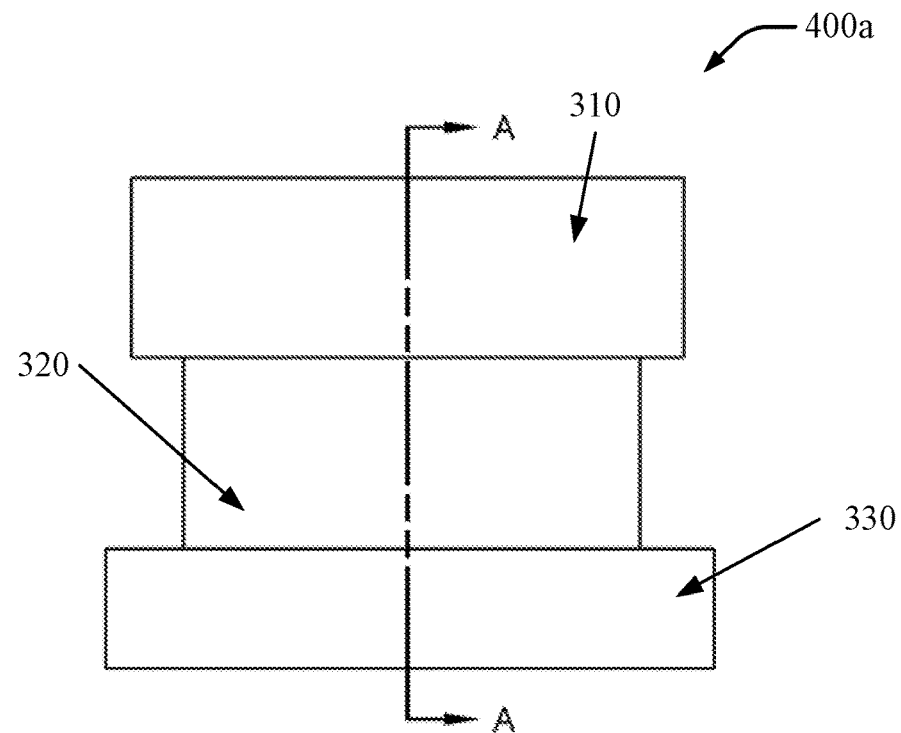
FIGS. 4A and 4B are diagrams that illustrate a side view and a cross-sectional view, respectively, of the high-bandwidth locking assembly of FIG. 3 in accordance with aspects of this disclosure.
Figure 4B:
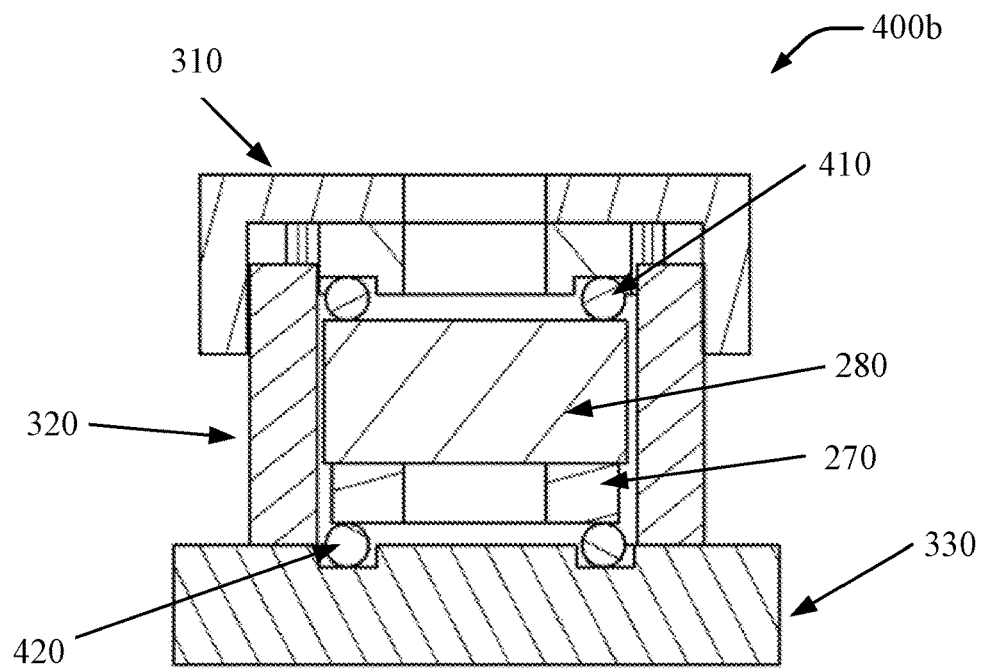

FIGS. 4A and 4B show diagrams 400a and 400b, respectively, that illustrate a side view and a cross-sectional view of the high-bandwidth locking assembly of the diagram 300 in FIG. 3. For example, the diagram 400a simple shows a side view indicating a cross sectional view A-A through the middle of the locking assembly, the details of which are described in the diagram 400b, where the arrangement of the cap 310, the shaft 320, and the mounting plate 330 is illustrated. As describe above, in some implementations, the shaft 320 and the mounting plate 330 can be integrated into a single component or structure.

As shown in the diagram 400b, the cap 310 can be positioned (e.g., tightened) onto the shaft 320 to provide pressure to a first or upper compliant material (such as an O-ring) 410 that is positioned or placed between a top portion or surface of the cavity output coupler mirror 280 and an inner portion or surface of the cap 310. The tightening of the cap 310 also provides pressure on a second or lower compliant material (e.g., mechanical gaskets such as an O-ring) 420 positioned or placed between a top portion or surface of the mounting plate 330 and a lower portion or surface of the piezo 270. The cap 310 and the mounting plate 330 can be configured to have grooves within which the compliant materials (e.g., mechanical gaskets such as O-rings) can be secured. These grooves may have a circular configuration to match the round shape of these components (see e.g., FIG. 3), but the disclosure need not be so limited and the grooves may have different configurations other than circular. Moreover, multiple grooves may be used to accommodate multiple compliant materials.

As described above, the cap 310 can be a threaded cap and the shaft 320 can be a threaded shaft, and they can be held together by threading the cap 310 onto the shaft 320. In such an example, the cap 310 may be threaded on the outside of the shaft 320 as illustrated on the diagrams 400a and 400b. In other examples, the cap 310 may the threaded on the inside of the shaft 320.

The materials used for the different components or structures shown in FIGS. 4A and 4B may be selected so that they can operate at high-vacuum or ultra-high-vacuum conditions or systems. Accordingly, the materials from which the cap 310, the shaft 320, the mounting plate 330, the compliant materials 410 and 420, the cavity output coupler mirror 280, and/or the piezo 270 are preferably made of materials with low outgassing.

Pressurizing the locking assembly using the cap 310 and the shaft 320 to an appropriate pressure enables in part the high-frequency behavior of the locking assembly by reducing the gain of natural resonances and increasing their frequencies. This insensitivity to pressure is an advantage for manufacturability and versatility of the locking assembly and the output optical coupler 130. Thus, in general, the locking assembly is insensitive to, and works over, a broad range of pressures, and that the optimal pressure can be determined from broadband transfer function measurements, e.g. using a Michelson interferometer or adding a swept-sine noise source to the repetition rate locking setup.

The piezo 270 shown in the diagram 400b can be a ring piezoelectric actuator with an opening in the center. The cap 310 can also have an opening or transparent medium in the center, and so can the cavity output coupler mirror 280 and the mounting plate 330 to enable at least a portion of the light incident on the locking assembly (and thus on the output optical coupler 130) to be coupled out of the laser.

Figure 5:
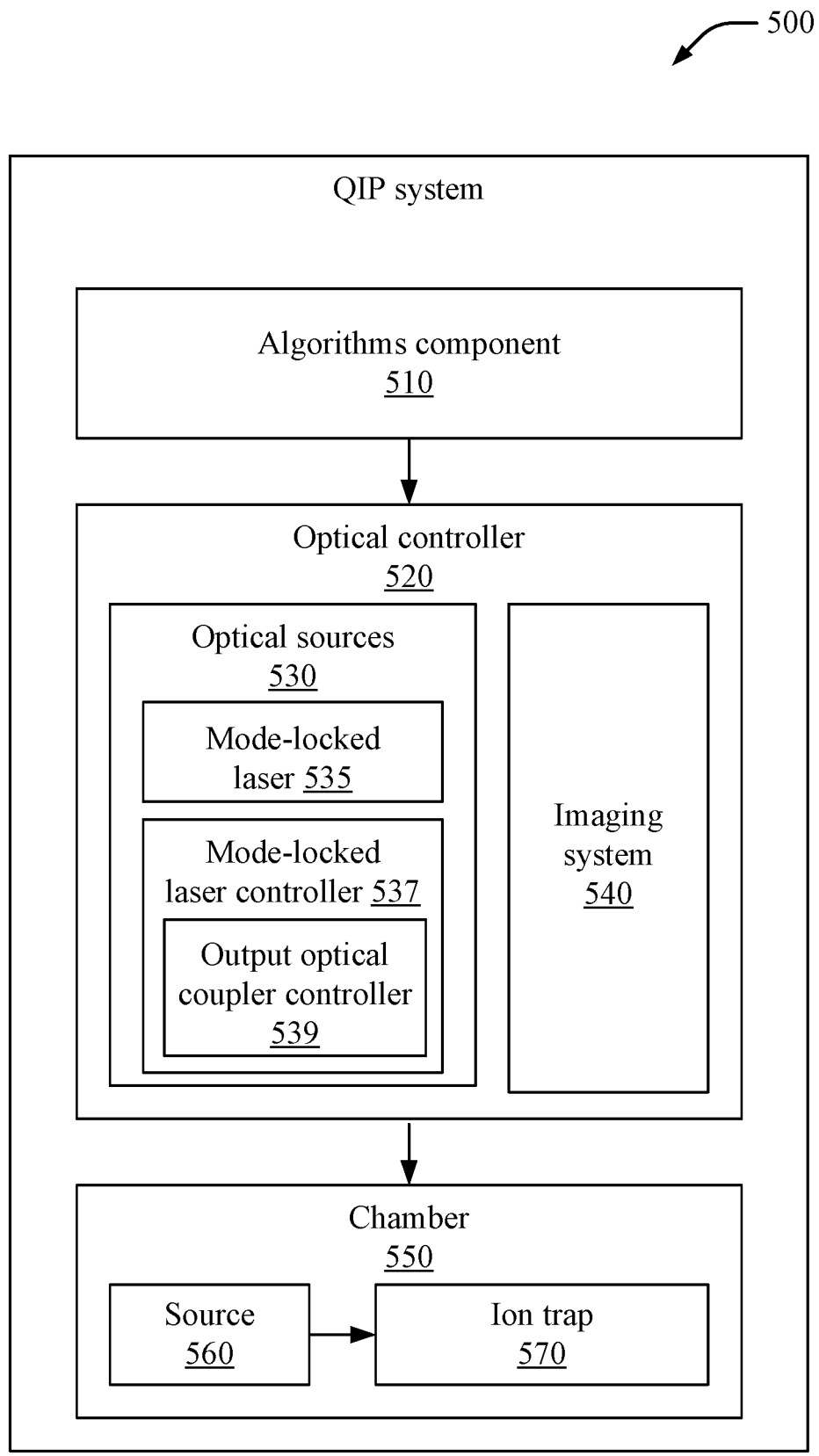
FIG. 5 is a block diagram that illustrates an example of a trapped-ion-based QIP system using a mode-locked laser in accordance with aspects of this disclosure.

FIG. 5 shows an example of a QIP system 500 in accordance with aspects of this disclosure. The QIP system 500 may also be referred to as a quantum computing system, a quantum computing network, a computer device, a trapped-ion quantum computer, or the like. In an aspect, the QIP system 500 may be used to implement or perform quantum computing operations, algorithms, or simulations for which the fidelity of the quantum gates being implemented depends on the ability to have a tuned, stable laser output applied to, for example, trapped ions used as quantum bits. The QIP system 500 may correspond to a quantum computer implementation of the computer device 600 in FIG. 6.

The QIP system 500 can include a source 560 that provides atomic species to a chamber 550 having an ion trap 570 that traps the atomic species (e.g., trapped ions) once ionized by an optical controller 520. Optical sources 530 in the optical controller 520 may include one or more laser sources that can be used for ionization of the atomic species, control (e.g., phase control) of the atomic ions, for fluorescence of the atomic ions that can be monitored and tracked by image processing algorithms operating in an imaging system 540 in the optical controller 51020, and/or for other aspects including those described above in connection with laser cavity repetition rate tuning and high-bandwidth stabilization.

In an implementation, the optical sources 530 in the optical controller 520 can include one or more lasers. For example, the optical sources 530 can include a mode-locked laser 535 (or some form of pulsed laser) and a mode-locked laser controller 537 to control the mode-locked laser 535. The mode-locked laser 535 can have an output optical coupler, such as the ones described above in connection with FIGS. 1 and 2, which in turn can have a high-frequency locking assembly to lock a cavity output coupler mirror and a piezo, such as the ones described above in connection with FIGS. 3, 4A, and 4B. The mode-locked laser controller 537 can be configured to perform detection and feedback control to ensure the frequency comb spectrum produced by the mode-locked laser 535 is appropriate for quantum computing operations. Alternatively, the mode-locked laser 535 and the mode-locked laser controller 537 may be implemented separately from other optical sources in the optical sources 530. The mode-locked laser controller 537 may include an output optical coupler controller 539 to generate signals that control the various components or elements of the output optical controller (e.g., control the operational degrees of freedom). Moreover, the detection and feedback control of the frequency comb spectrum may be additionally or alternatively performed by the output optical coupler controller 539.

The imaging system 540 can include a high resolution imager (e.g., CCD camera) for monitoring the atomic ions while they are being provided to the ion trap 570 (e.g., for counting) or after they have been provided to the ion trap 570 (e.g., for monitoring the atomic ions states). In an aspect, the imaging system 540 can be implemented separate from the optical controller 520, however, the use of fluorescence to detect, identify, and label atomic ions using image processing algorithms may need to be coordinated with the optical controller 520.

The QIP system 500 may also include an algorithms component 510 that may operate with other parts of the QIP system 500 (not shown) to perform quantum algorithms (e.g., quantum Fourier transform (QFT), quantum circuits including sequences of quantum gates, quantum simulations) that make use of the implementations described above. The algorithms component 510 may provide instructions to various components of the QIP system 500 (e.g., to the optical controller 520) to enable the implementation of quantum circuits, or their equivalents. That is, the algorithms component 510 may allow for mapping of different computing primitives into physical representations using, for example, the trapped ions in the ion trap 570 as qubits.

Figure 6:
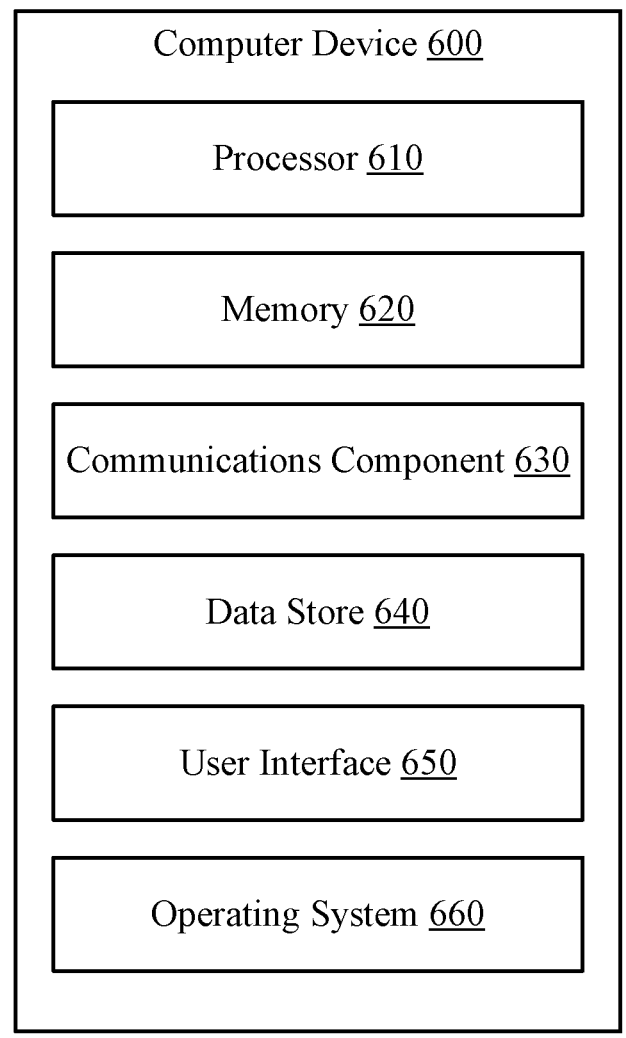
FIG. 6 is a diagram that illustrates an example of a computer device, in accordance with aspects of this disclosure.

Referring now to FIG. 6, illustrated is an example computer device 600 in accordance with aspects of the disclosure. The computer device 600 can represent a single computing device, multiple computing devices, a distributed computing system, or at least a portion of a computing network, for example. The computer device 600 may be configured as a quantum computer, a classical computer, or a combination of quantum and classical computing functions.

In one example, the computer device 600 may include a processor 610 for carrying out processing functions associated with one or more of the features described herein. The processor 610 may include a single or multiple set of processors or multi-core processors. Moreover, the processor 610 may be implemented as an integrated processing system and/or a distributed processing system. The processor 610 may include a central processing unit (CPU), a quantum processing unit (QPU), a graphical processing unit (GPU), or combination of those types of processors. In one aspect, the processor 610 may be implemented using a chain or linear crystal of trapped ions in a trap (e.g., the ion trap 570).

In an example, the computer device 600 may include a memory 620 for storing instructions executable by the processor 610 for carrying out the functions described herein. In an implementation, for example, the memory 620 may correspond to a computer-readable storage medium that stores code or instructions to perform one or more of the functions or operations described herein. In one example, the memory 620 may include one or more memory qubits.

Further, the computer device 600 may include a communications component 630 that provides for establishing and maintaining communications with one or more parties utilizing hardware, software, and services as described herein. The communications component 630 may carry communications between components on the computer device 600, as well as between the computer device 600 and external devices, such as devices located across a communications network and/or devices serially or locally connected to computer device 600. For example, the communications component 630 may include one or more buses, and may further include transmit chain components and receive chain components associated with a transmitter and receiver, respectively, operable for interfacing with external devices.

Additionally, the computer device 600 may include a data store 640, which can be any suitable combination of hardware and/or software, that provides for mass storage of information, databases, and programs employed in connection with implementations described herein. For example, the data store 640 may be a data repository for operating system 660 (e.g., classical OS, or quantum OS). In one implementation, the data store 940 may include the memory 620.

The computer device 600 may also include a user interface component 650 operable to receive inputs from a user of the computer device 600 and further operable to generate outputs for presentation to the user or to provide to a different system (directly or indirectly). The user interface component 650 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 650 may include one or more output devices, including but not limited to a display, a speaker, a haptic feedback mechanism, a printer, any other mechanism capable of presenting an output to a user, or any combination thereof.

In an implementation, the user interface component 650 may transmit and/or receive messages corresponding to the operation of the operating system 660. In addition, the processor 610 may execute the operating system 660 and/or applications or programs, and the memory 620 or the data store 640 may store them.

When the computer device 600 is implemented as part of a cloud-based infrastructure solution, the user interface component 650 may be used to allow a user of the cloud-based infrastructure solution to remotely interact with the computer device 600.

Aspects of the computer device 600 can implement and/or be implemented with one or more of the components or structures shown in connection with the output optical coupler and the high-frequency locking assembly described herein.

Figure 7:
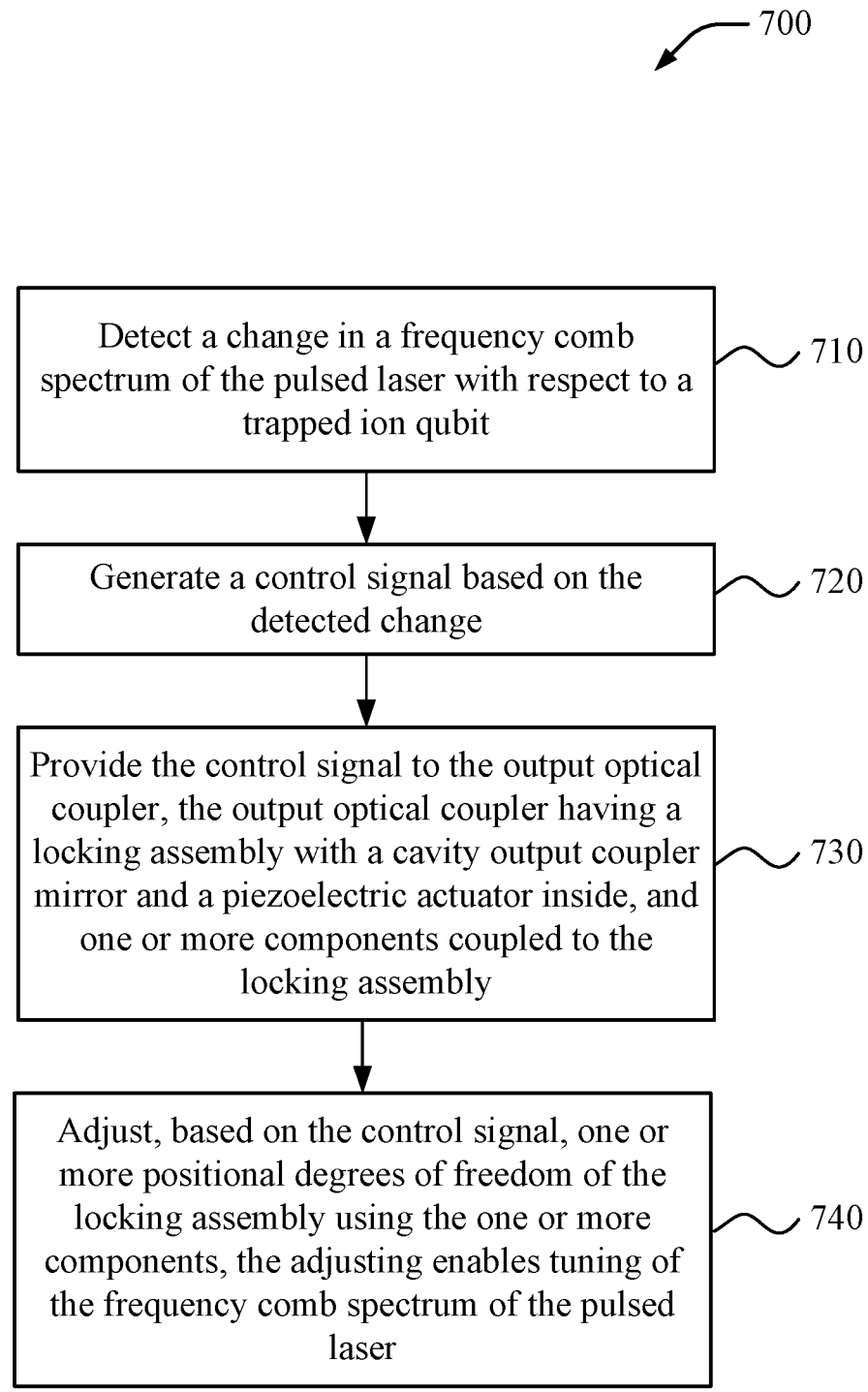
FIG. 7 is a flow chart illustrating an example of a method for tuning a laser cavity repetition rate for quantum computing operations in accordance with aspects of this disclosure

FIG. 7 is a flow chart illustrating an example of a method 700 for adjusting an output optical coupler in a pulsed laser. The method 700 may be performed by the QIP system 500 or the computer device 600 described above. The method 700 may be used with different applications, including but not limited to quantum information processing.

At block 710, the method 700 includes detecting a change in a frequency comb spectrum of the pulsed laser with respect to a trapped ion qubit. In an example, the optical controller 520 and/or the mode-locked laser controller 537 can monitor and detect variations in the output of the pulsed laser that would require correction of the operations of the laser cavity.

At block 720, the method 700 includes generating a control signal based on the detected change. In an example, the optical controller 520 and/or the mode-locked laser controller 537 can generate one or more feedback control signals to be provided to the mode-locked laser 535 for adjustment.

At block 730, the method 700 includes providing the control signal to the output optical coupler, the output optical coupler having a locking assembly with a cavity output coupler mirror and a piezoelectric actuator inside, and one or more components (see e.g., FIG. 2) coupled to the locking assembly.

At block 740, the method 700 includes adjusting, based on the control signal, one or more positional degrees of freedom of the locking assembly using the one or more components, where the adjusting enabling tuning of the frequency comb spectrum of the pulsed laser.

In an aspect of the method 700, the multiple components include a linear stage having an actuator configured to provide longitudinal travel along a length of a cavity direction of the pulsed laser, and adjusting one or more positional degrees of freedom of the locking assembly using one or more of the multiple components includes adjusting the linear stage.

In an aspect of the method 700, the multiple components include a rotation stage having an actuator configured to provide angular rotation of the locking assembly, and adjusting one or more positional degrees of freedom of the locking assembly using one or more of the multiple components includes adjusting the rotation stage.

In an aspect of the method 700, the multiple components include a tip-tilt mirror mount having an actuator configured to provide an angular tilt to the locking assembly, and adjusting one or more positional degrees of freedom of the locking assembly using one or more of the multiple components includes adjusting the tip-tilt mirror mount.

In another aspect of the method 700, the one or more components include a linear stage configured to provide vertical translation in one direction, horizontal translation in one or two directions, or a combination thereof, a tip-tilt mirror mount configured to provide tip-tilt in one direction, two directions, or three directions, a rotation stage configured to rotate, or a combination thereof (see e.g., FIG. 2), and where adjusting one or more positional degrees of freedom of the locking assembly using the one or more of the components includes adjusting the linear stage, the tip-tilt mirror mount, the rotation stage, or a combination thereof.

The method 700 may be used in connection with various applications. For example, the adjustment of the cavity length tunes the repetition rate of the mode-locked laser to enable target features in the application, such as qubit manipulation with suppressed AC Stark shifts. In another example, stabilization of the cavity length over the long term can be critical for the performance of target applications, such as the coherence time of the qubit manipulation. In yet another example, the stabilization of the cavity length stabilizes off resonant transitions, such as from other comb teeth, so that they can be calibrated and/or corrected. In yet another example, the adjustment of the cavity length stabilizes and positions in frequency space the off resonant transitions, such as from other comb teeth, so that they can be minimized, calibrated, and/or corrected. In yet another example, the stabilization of the cavity length stabilizes all comb teeth (as opposed to feed forward) allowing for use of different comb teeth which is critical for some target applications, such as phase insensitive qubit manipulations. Moreover, the adjustment and stabilization of the cavity length enables the locking together of multiple lasers for scaling up of a modular quantum computer by enabling, for example, coherent qubit manipulations between distant modules.

As such, in another aspect of the method 700, adjusting one or more positional degrees of freedom of the locking assembly using the one or more components includes adjusting a cavity length associated with the output optical coupler for tuning of a repetition rate of the pulsed laser to enable features in a target quantum processing application including qubit manipulation with suppressed AC Stark shifts.

In another aspect of the method 700, adjusting one or more positional degrees of freedom of the locking assembly using the one or more components includes adjusting a cavity length associated with the output optical coupler for stabilizing a repetition rate of the pulsed laser to enable features in a target quantum processing application including stabilization of the coherence time of a qubit manipulation.

In another aspect of the method 700, adjusting one or more positional degrees of freedom of the locking assembly using the one or more components includes adjusting a cavity length associated with the output optical coupler for stabilizing off resonant transitions from a comb teeth in the frequency comb spectrum to enable calibration and/or correction of the off resonant transitions.

In another aspect of the method 700, adjusting one or more positional degrees of freedom of the locking assembly using the one or more components includes adjusting a cavity length associated with the output optical coupler for stabilizing and positioning off resonant frequencies from other comb teeth in the frequency comb spectrum to enable minimization, calibration, and/or correction of the off resonant frequencies.

In another aspect of the method 700, adjusting one or more positional degrees of freedom of the locking assembly using the one or more components includes adjusting a cavity length associated with the output optical coupler for stabilizing all comb teeth in the frequency comb spectrum to allow the use of different comb teeth in target applications including phase insensitive qubit manipulations.

In another aspect of the method 700, adjusting one or more positional degrees of freedom of the locking assembly using the one or more components includes adjusting a cavity length associated with the output optical coupler for locking the pulsed laser with other lasers to scale up a modular quantum computer by enabling coherent qubit manipulations between distant modules in the modular quantum computer.

Although the present disclosure has been provided in accordance with the implementations shown, one of ordinary skill in the art will readily recognize that there could be variations to the embodiments and those variations would be within the scope of the present disclosure. Accordingly, many modifications may be made by one of ordinary skill in the art without departing from the scope of the appended claims.

What is claimed is:

1. An output optical coupler for a pulsed laser, comprising:
   a cavity output coupler mirror;
   a piezoelectric actuator coupled to the cavity output coupler mirror;
   a locking assembly within which the cavity output coupler mirror and the piezoelectric actuator are positioned; and
   one or more components coupled to the locking assembly and configured to provide multiple positional degrees of freedom for tuning a frequency comb spectrum of the pulsed laser by adjusting at least one position of the locking assembly with the cavity output coupler mirror,
   wherein the locking assembly is configured to provide high-bandwidth stabilization by mechanically decoupling the piezoelectric actuator and the cavity output coupler mirror from environmental vibrations in the pulsed laser.

2. The output optical coupler of claim 1, wherein:
   the pulsed laser produces optical beams that drive transitions in one or more atomic qubits for quantum information processing, the efficiency of the transitions being based on spacing of comb lines in the frequency comb spectrum, and
   the one or more components tune the frequency comb spectrum of the pulsed laser with respect to the one or more atomic qubits to drive the transitions by having the one or more components adjust the at least one position of the locking assembly to change an optical path within a laser cavity used to generate the pulsed laser.

3. The output optical coupler of claim 2, wherein the one or more atomic qubits include one or more trapped ion qubits.

4. The output optical coupler of claim 1, wherein the one or more components include a linear stage having one or more actuators configured to provide longitudinal travel of the locking assembly along a length of a cavity direction of the pulsed laser, transverse travel of the locking assembly along a width of the cavity direction of the pulsed laser, or a combination of longitudinal travel and transverse travel.

5. The output optical coupler of claim 1, wherein the one or more components include a rotation stage having one or more actuators configured to provide angular rotation of the locking assembly.

6. The output optical coupler of claim 1, wherein the one or more components include a tip-tilt mirror mount having one or more actuators configured to provide an angular tilt to the locking assembly.

7. The output optical coupler of claim 6, wherein the angular tilt to the locking assembly is in one spatial direction, two spatial directions, or three spatial directions.

8. The output optical coupler of claim 1, further comprising a base plate configured to rigidly connect the one or more components to a plate of the pulsed laser.

9. The output optical coupler of claim 1, wherein the one or more components are configured to provide six positional degrees of freedom including three translational degrees of freedom and three (3) tip-tilt degrees of freedom.

10. The output optical coupler of claim 1, wherein the one or more components include:
a linear stage coupled to the base plate, the linear stage configured to provide vertical translation in one direction, horizontal translation in one or two directions, or a combination thereof;
a tip-tilt mirror mount coupled to the linear stage, the tip-tilt mirror configured to provide tip-tilt in one direction, two directions, or three directions;
a rotation stage coupled to the tip-tilt mirror mount, wherein the locking assembly is coupled to the rotation stage; or
a combination thereof.

11. The output optical coupler of claim 1, wherein each of the one or more components includes at least one motor-driven actuator to control a respective one of the positional degrees of freedom.

12. The output optical coupler of claim 1, wherein each of the one or more components includes at least one piezoelectric actuator to control a respective one of the positional degrees of freedom.

13. The output optical coupler of claim 1, wherein the locking assembly includes:
a housing top portion; and
a housing bottom portion that together with the housing top portion form an enclosed space within which the piezoelectric actuator and the cavity output coupler mirror are positioned,
wherein the housing top portion and the housing bottom portion are held together to provide a controlled pressure and corresponding frequency response.

14. The output optical coupler of claim 13, wherein:
the housing top portion of the locking assembly includes a cap,
the housing bottom portion of the locking assembly includes a shaft, and
the housing top portion and the housing bottom portion of the locking assembly are held together to provide the controlled pressure and the corresponding frequency response via one or more of a set of screws and bolts, a set of screws, or wedged structures.

15. The output optical coupler of claim 13, wherein:
the housing top portion of the locking assembly includes a threaded cap,
the housing bottom portion of the locking assembly includes a threaded shaft, and the housing top portion and the housing bottom portion of the locking assembly are held together to provide the controlled pressure and the corresponding frequency response by tightening the threaded cap onto the threaded shaft.

16. The output optical coupler of claim 15, wherein the threaded cap and the threaded shaft are made at least in part of brass.

17. The output optical coupler of claim 13, wherein:
the housing top portion of the locking assembly includes a cap, and
the housing bottom portion of the locking assembly includes a shaft and a mounting plate on which the shaft is positioned.

18. The output optical coupler of claim 17, wherein the cap and the shaft are made at least in part of brass and the mounting plate is made at least in part of aluminum.

19. The output optical coupler of claim 13, wherein the locking assembly further includes:

a first compliant component within the enclosed space and positioned between the cavity output coupler mirror and an inner part of the top portion; and
a second compliant component within the enclosed space and positioned between the piezoelectric actuator and an inner part of the bottom portion,
the first compliant component and the second compliant component being pressed by tightening of the top portion onto the bottom portion.

20. The output optical coupler of claim 19, wherein each of the first compliant component and the second compliant component is a mechanical gasket.

21. The output optical coupler of claim 19, wherein each of the first compliant component and the second compliant component is an O-ring.

22. The output optical coupler of claim 19, wherein each of the first compliant component and the second compliant component are made of materials compatible with high vacuum or ultra-high-vacuum systems.

23. The output optical coupler of claim 1, wherein the piezoelectric actuator is a ring piezoelectric actuator.

24. The output optical coupler of claim 1, wherein the pulsed laser is one of:
a YAG mode-locked laser,
a Ti: Sapp mode-locked laser, or
fiber-based gain materials.

25. A method of adjusting an output optical coupler for a pulsed laser, the method comprising:
detecting a change in a frequency comb spectrum of the pulsed laser with respect to a trapped ion qubit, wherein the pulsed laser produces optical beams that drive transitions in the trapped ion qubit for quantum information processing, the efficiency of the transitions being based on spacing of comb lines in the frequency comb spectrum;
generating a control signal based on the detected change;
providing the control signal to the output optical coupler, the output optical coupler having:
a locking assembly with a cavity output coupler mirror and a piezoelectric actuator inside, and
one or more components coupled to the locking assembly; and
adjusting, based on the control signal, one or more positional degrees of freedom of the locking assembly using the one or more components to change an optical path within a laser cavity used to generate the pulsed laser, the adjusting enables tuning of the frequency comb spectrum of the pulsed laser, and
providing, by the locking assembly, high-bandwidth stabilization by mechanically decoupling the piezoelectric actuator and the cavity output coupler mirror from environmental vibrations in the pulsed laser.

26. The method of claim 25, wherein:
the one or more components include:
a linear stage configured to provide vertical translation in one direction, horizontal translation in one or two directions, or a combination thereof,
a tip-tilt mirror mount configured to provide tip-tilt in one direction, two directions, or three directions,
a rotation stage configured to rotate, or a combination thereof, and
adjusting one or more positional degrees of freedom of the locking assembly using the one or more of the components includes adjusting the linear stage, the tip-tilt mirror mount, the rotation stage, or a combination thereof.

27. The method of claim 25, wherein adjusting one or more positional degrees of freedom of the locking assembly using the one or more components includes adjusting a cavity length associated with the output optical coupler for tuning of a repetition rate of the pulsed laser to enable features in a target quantum processing application including qubit manipulation with suppressed AC Stark shifts.

28. The method of claim 25, wherein adjusting one or more positional degrees of freedom of the locking assembly using the one or more components includes adjusting a cavity length associated with the output optical coupler for stabilizing a repetition rate of the pulsed laser to enable features in a target quantum processing application including stabilization of the coherence time of a qubit manipulation.

29. The method of claim 25, wherein adjusting one or more positional degrees of freedom of the locking assembly using the one or more components includes adjusting a cavity length associated with the output optical coupler for stabilizing off resonant transitions from a comb teeth in the frequency comb spectrum to enable calibration and/or correction of the off resonant transitions.

30. The method of claim 25, wherein adjusting one or more positional degrees of freedom of the locking assembly using the one or more components includes adjusting a cavity length associated with the output optical coupler for stabilizing and positioning off resonant frequencies from other comb teeth in the frequency comb spectrum to enable minimization, calibration, and/or correction of the off resonant frequencies.

31. The method of claim 25, wherein adjusting one or more positional degrees of freedom of the locking assembly using the one or more components includes adjusting a cavity length associated with the output optical coupler for stabilizing all comb teeth in the frequency comb spectrum to allow the use of different comb teeth in target applications including phase insensitive qubit manipulations.

32. The method of claim 25, wherein adjusting one or more positional degrees of freedom of the locking assembly using the one or more components includes adjusting a cavity length associated with the output optical coupler for locking the pulsed laser with other lasers to scale up a modular quantum computer by enabling coherent qubit manipulations between distant modules in the modular quantum computer.

* * * * *